(12) United States Patent
Wang (10) Patent No.: US 9,367,340 B2
(45) Date of Patent: Jun. 14, 2016

(54) RESOURCE MANAGEMENT METHOD AND APPARATUS FOR VIRTUAL MACHINE SYSTEM, AND VIRTUAL MACHINE SYSTEM

(71) Applicant: HUAWEI TECHNOLOGIES CO., LTD., Shenzhen, Guangdong (CN)

(72) Inventor: Feng Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 3 days.

(21) Appl. No.: 14/446,718

(22) Filed: Jul. 30, 2014

(65) Prior Publication Data

US 2014/0344810 A1 Nov. 20, 2014

Related U.S. Application Data

(63) Continuation of application No. PCT/CN2012/087558, filed on Dec. 26, 2012.

(51) Int. Cl.
*G06F 9/455* (2006.01)
*G06F 9/50* (2006.01)

(52) U.S. Cl.
CPC .............. *G06F 9/455* (2013.01); *G06F 9/5011* (2013.01); *G06F 9/5072* (2013.01); *G06F 9/5083* (2013.01)

(58) Field of Classification Search
None
See application file for complete search history.

(56) References Cited

U.S. PATENT DOCUMENTS

| 8,584,128 B1* | 11/2013 | Don et al. ..................... 718/103 |
| 2009/0119673 A1* | 5/2009 | Bubba ........................... 718/104 |
| 2010/0268764 A1 | 10/2010 | Wee et al. |
| 2010/0281482 A1 | 11/2010 | Pike et al. |
| 2010/0332658 A1 | 12/2010 | Elyashev et al. |
| 2011/0022861 A1 | 1/2011 | Agneeswaran et al. |
| 2011/0173327 A1* | 7/2011 | Chen et al. ..................... 709/226 |
| 2011/0185064 A1* | 7/2011 | Head et al. ..................... 709/226 |
| 2011/0213686 A1 | 9/2011 | Ferris et al. |
| 2011/0225299 A1* | 9/2011 | Nathuji et al. ................. 709/226 |
| 2011/0258621 A1 | 10/2011 | Kern et al. |
| 2012/0089726 A1 | 4/2012 | Doddavula et al. |
| 2013/0198740 A1* | 8/2013 | Arroyo et al. ..................... 718/1 |
| 2013/0275965 A1* | 10/2013 | Dawson et al. ................... 718/1 |
| 2014/0115586 A1 | 4/2014 | Hong et al. |

FOREIGN PATENT DOCUMENTS

| CN | 101719082 A | 6/2010 |
| CN | 102307224 A | 1/2012 |
| CN | 102317917 A | 1/2012 |
| CN | 102419718 A | 4/2012 |
| WO | 2012160124 A1 | 11/2012 |

* cited by examiner

*Primary Examiner* — H S Sough
*Assistant Examiner* — Umut Onat
(74) *Attorney, Agent, or Firm* — Huawei Technologies Co., Ltd.

(57) ABSTRACT

An embodiment of the present invention provides a resource management method for a virtual machine system, where the method includes: obtaining, by a virtual resource management platform, a QoS constraint parameter of a virtual machine cluster and a current operating status statistical indicator of the virtual machine cluster, and according to the QoS constraint parameter of the virtual machine cluster and the current operating status statistical indicator of the virtual machine cluster, adjusting physical resources scheduling policy of a physical device platform or performing physical resource scheduling on the physical device platform. The method may ensure QoS of a cloud application.

16 Claims, 5 Drawing Sheets

RESOURCE MANAGEMENT METHOD AND APPARATUS FOR VIRTUAL MACHINE SYSTEM, AND VIRTUAL MACHINE SYSTEM

CROSS-REFERENCE TO RELATED APPLICATIONS

This application is a continuation of International Application No. PCT/CN2012/087558, filed on Dec. 26, 2012, which is hereby incorporated by reference in their entireties.

TECHNICAL FIELD

Embodiments of the present invention relate to the field of IT technologies, and in particular, to a resource management method and apparatus for a virtual machine system, and a virtual machine system.

BACKGROUND

An application environment of cloud computing may be divided into three layers, which are a cloud application, a virtual resource management platform, and a physical device management platform. The cloud application refers to a program running on a cloud application layer, includes one or more processes during running, and may be distributed on one or more virtual machines (Virtual Machine, VM). The virtual resource management platform virtualizes physical resources, and provides the outside with virtual resources such as a VM, a VM cluster, a virtual volume, and a virtual network. With the development of cloud computing, an assurance of quality of service (Quality of Service, QoS) of the cloud application attracts more and more attention. In the prior art, QoS scheduling is performed through a scheduling module of the virtual resource management platform. Scheduling modules may be classified into an upper layer scheduling module from the cloud application to the virtual resource management platform, and a lower layer scheduling module from the virtual resource management platform to the physical device management platform. In the prior art, the upper layer scheduling module performs adjustment on a virtual resource of a VM cluster according to actual state information of the cloud application. For example, the upper layer scheduling module, based on real-time state information such as traffic and a throughput situation of the cloud application, determines a virtual resource that needs to be used by the cloud application, and determines to increase or decrease the number of VMs used for processing the cloud application, or determines to perform virtual resource capacity expansion or capacity reduction on a created VM. The upper layer scheduling module sends an instruction for increasing or decreasing VMs or an instruction for adjusting a VM resource configuration to the lower layer scheduling module. The lower layer scheduling module, according to the instruction, increases or decreases the VMs, or performs capacity expansion or capacity deduction for the VM by scheduling physical resources.

It can be seen that in the prior art, the assurance of QoS of the VM cluster mainly depends on that the upper layer scheduling module, according to a real-time state of the cloud application, makes a decision and instructs the lower layer to perform adjustment; on the other hand, the physical device platform providing physical resources of the VM cluster also has physical resources scheduling policy or physical resource scheduling based on objectives of energy consumption management and saving. For example, it is set that a physical machine capacity deduction threshold of a physical device platform is that a physical resource average utilization rate is 30%. When the physical resource average utilization rate of the physical device platform is less than 30%, a full migration or power-down operation is performed on a physical machine on the physical device platform, so as to reduce energy consumption.

However, the independent physical resource scheduling policy or physical resource scheduling on the physical device platform may incur the following conflicts.

When the upper layer scheduling module determines, according to a real-time status of the cloud application, to perform capacity expansion on the VM or increase the number of VMs, a power-down operation of the physical machine is performed on the physical device platform, so that in order to create a new VM or perform capacity expansion on a VM, a certain physical machine is powered up temporarily, which therefore causes a delay of the virtual machine creation or capacity expansion operation to be long, thereby failing to ensure the QoS of the cloud application, or causes the physical machine on the physical device platform to be powered up and down repeatedly, thereby failing to reduce energy consumption.

SUMMARY

The present invention provides a resource management method and apparatus for a virtual machine system, and a virtual machine system, so as to solve a problem that QoS of a cloud application cannot be ensured due to physical resource scheduling of a physical device platform.

In a first aspect, an embodiment of the present invention provides a resource management method for a virtual machine system, where the virtual machine system provides service for at least one cloud application, the system includes a virtual resource management platform and a physical device platform, the physical device platform includes at least one physical machine, the virtual resource management platform creates at least one virtual machine for each cloud application according to physical resources provided by the physical device platform, the at least one virtual machine corresponding to each cloud application forms a virtual machine cluster; and the method includes:

obtaining a QoS constraint parameter of the virtual machine cluster;

obtaining a current operating status statistical indicator of the virtual machine cluster; and according to the QoS constraint parameter of the virtual machine cluster and the current operating status statistical indicator of the virtual machine cluster, adjusting physical resources scheduling policy of the physical device platform or performing physical resource scheduling on the physical device platform.

In a first possible implementation manner, in a creation process of the virtual machine cluster, receive a creation request for creating the virtual machine cluster, or in an operation process of the virtual machine cluster, receive a resource update request of the virtual machine cluster, where the creation request or the update request carries the QoS constraint parameter of the virtual machine cluster; and record the QoS constraint parameter of the virtual machine cluster.

The obtaining the QoS constraint parameter of the virtual machine cluster includes:

obtaining the QoS constraint parameter of the virtual machine cluster recorded in the creation process of the virtual machine cluster or in the operation process of the virtual machine cluster.

In combination with the first possible implementation manner of the first aspect, in a second possible implementation manner, the QoS constraint parameter of the virtual machine cluster includes: a resource average utilization rate constraint parameter of the virtual machine cluster; obtain a statistical value of a current resource average utilization rate of the virtual machine cluster; compare the statistical value of the current resource average utilization rate of the virtual machine cluster with the resource average utilization rate constraint parameter of the virtual machine cluster; if the statistical value of the current resource average utilization rate of the virtual machine cluster is smaller than the resource average utilization rate constraint parameter of the virtual machine cluster and a difference between the two is smaller than a set tolerance threshold, suppress a physical machine capacity deduction operation on the physical device platform, and/or power up at least one physical machine on the physical device platform.

Specifically, the suppressing the physical machine capacity deduction operation on the physical device platform includes: increasing a physical machine capacity deduction threshold on the physical device platform, or not initiating a physical machine full migration or power-down operation on the physical device platform within a predetermined duration.

In combination with the second possible implementation manner of the first aspect, in a third possible implementation manner, the QoS constraint parameter of the virtual machine cluster further includes: an upper limit or a lower limit of total occupied resources of the virtual machine cluster; the obtaining the current operating status statistical indicator of the virtual machine cluster further includes: obtaining a statistical value of currently total occupied resources of the virtual machine cluster; the powering up the at least one physical machine on the physical device platform specifically includes: obtaining a difference between the statistical value of the currently total occupied resources of the virtual machine cluster and the upper limit of the total occupied resources of the virtual machine cluster, and according to the difference, selecting a physical machine of a corresponding specification to perform a power-up operation.

In combination with the second possible implementation manner of the first aspect, in a fourth possible implementation manner, if the statistical value of the current resource average utilization rate of the virtual machine cluster is greater than the resource average utilization rate constraint parameter of the virtual machine cluster, raise physical resources scheduling priority level of the virtual machine cluster.

In combination with the first possible implementation manner of the first aspect, in a fifth possible implementation manner, the QoS constraint parameter of the virtual machine cluster includes: an average communication delay constraint parameter of the virtual machine cluster; the obtaining the current operating status statistical indicator of the virtual machine cluster includes: obtaining a statistical value of a current average communication delay of the virtual machine cluster; comparing the statistical value of the current average communication delay of the virtual machine cluster with the average communication delay constraint parameter of the virtual machine cluster; if the statistical value of the current average communication delay of the virtual machine cluster is greater than the average communication delay constraint parameter of the virtual machine cluster, or a difference between the two is smaller than a set tolerance threshold, centrally deploying the virtual machine of the virtual machine cluster on a same physical machine.

In a second aspect, an embodiment of the present invention further provides a virtual machine system, where the virtual machine system provides service for at least one cloud application, the system includes a virtual resource management platform and a physical device platform; the physical device platform includes at least one physical machine, configured to provide physical resources; the virtual resource management platform is configured to create at least one virtual machine for each cloud application according to the physical resource provided by the physical device platform, where the at least one virtual machine corresponding to each cloud application forms a virtual machine cluster; monitor an operating status of the cloud application; determine, according to the operating status of the cloud application, whether to update a resource of the virtual machine cluster corresponding to the cloud application; and schedule the physical resource on the physical device platform to implement creation or resource update of the virtual machine cluster.

The virtual resource management platform is further configured to obtain a QoS constraint parameter of the virtual machine cluster and a current operating status statistical indicator of the virtual machine cluster, and according to the QoS constraint parameter of the virtual machine cluster and the current operating status statistical indicator of the virtual machine cluster, adjust physical resources scheduling policy of the physical device platform or perform physical resource scheduling on the physical device platform.

In a first possible implementation manner, the virtual resource management platform is further configured to, in a creation process of the virtual machine cluster, receive a creation request of the virtual machine cluster; or in an operation process of the virtual machine cluster, receive a resource update request of the virtual machine cluster, where the creation request or the update request carries the QoS constraint parameter of the virtual machine cluster; and record the QoS constraint parameter of the virtual machine cluster.

In combination with the first possible implementation manner of the second aspect, in a second possible implementation manner, the QoS constraint parameter of the virtual machine cluster includes a resource average utilization rate constraint parameter of the virtual machine cluster, and the current operating status statistical indicator of the virtual machine cluster includes a statistical value of a current resource average utilization rate of the virtual machine cluster.

The virtual resource management platform is specifically configured to compare the statistical value of the current resource average utilization rate of the virtual machine cluster with the resource average utilization rate constraint parameter of the virtual machine cluster; if the statistical value of the current resource average utilization rate of the virtual machine cluster is smaller than the resource average utilization rate constraint parameter of the virtual machine cluster and a difference between the two is smaller than a set tolerance threshold, suppress a physical machine capacity deduction operation on the physical device platform, and/or power up at least one physical machine on the physical device platform.

In combination with the second possible implementation manner of the second aspect, in a third possible implementation manner, the QoS constraint parameter of the virtual machine cluster further includes: an upper limit or a lower limit of total occupied resources of the virtual machine cluster; the current operating status statistical indicator of the virtual machine cluster includes a statistical value of currently total occupied resources of the virtual machine cluster; the virtual resource management platform is further configured to obtain a difference between the statistical value of the currently total occupied resources of the virtual machine cluster and the upper limit of the total occupied resources of the virtual machine cluster, and according to the difference, select a physical machine of a corresponding specification to perform a power-up operation.

In combination with the second possible implementation manner of the second aspect, in a fourth possible implementation manner, the virtual resource management platform is further configured to, when the statistical value of the current resource average utilization rate of the virtual machine cluster is greater than the resource average utilization rate constraint parameter of the virtual machine cluster, raise physical resources scheduling priority level of the virtual machine cluster.

In combination with the first possible implementation manner of the second aspect, in a fifth possible implementation manner, the QoS constraint parameter of the virtual machine cluster includes: an average communication delay constraint parameter of the virtual machine cluster; the current operating status statistical indicator of the virtual machine cluster includes a statistical value of a current average communication delay of the virtual machine cluster; the virtual resource management platform is configured to compare the statistical value of the current average communication delay of the virtual machine cluster with the average communication delay constraint parameter of the virtual machine cluster, and if the statistical value of the current average communication delay of the virtual machine cluster is greater than the average communication delay constraint parameter of the virtual machine cluster and a difference between the two is smaller than a set tolerance threshold, centrally deploy the virtual machine of the virtual machine cluster on a same physical machine.

In a third aspect, an embodiment of the present invention further provides a resource management apparatus for a virtual machine system, where the virtual machine system provides service for at least one cloud application, the system includes a virtual resource management platform and a physical device platform, the physical device platform includes at least one physical machine, the virtual resource management platform creates at least one virtual machine for each cloud application according to physical resources provided by the physical device platform, and the at least one virtual machine corresponding to each cloud application forms a virtual machine cluster.

The apparatus includes:

a constraint parameter obtaining module, configured to obtain a QoS constraint parameter of the virtual machine cluster;

a statistical indicator obtaining module, configured to obtain a current operating status statistical indicator of the virtual machine cluster; and a management module, configured to, according to the QoS constraint parameter of the virtual machine cluster and the current operating status statistical indicator of the virtual machine cluster, adjust physical resources scheduling policy of the physical device platform or perform physical resource scheduling on the physical device platform.

In a fourth aspect, an embodiment of the present invention further provides a resource management apparatus for a virtual machine system, where the virtual machine system provides service for at least one cloud application, the system includes a virtual resource management platform and a physical device platform, the physical device platform includes at least one physical machine, the virtual resource management platform creates at least one virtual machine for each cloud application according to physical resources provided by the physical device platform, and the at least one virtual machine corresponding to each cloud application forms a virtual machine cluster.

The apparatus includes a processor, a memory unit, a bus, and a communication interface.

The memory unit is configured to store a computer executable instruction, the processor and the memory unit are connected through the bus; when the management apparatus for the virtual machine system runs, the processor executes the computer executable instruction stored by the memory unit, so that the management apparatus for the virtual machine system executes the resource management method for a virtual machine system according to the foregoing first aspect.

In a fifth aspect, an embodiment of the present invention further provides a computer readable medium, which includes a computer executable instruction, so that when a processor of a computer executes the computer executable instruction, the computer executes the resource management method for a virtual machine system according to the foregoing first aspect.

In the embodiments of the present invention, an actual operating status of a virtual machine cluster and a QoS constraint parameter of the virtual machine cluster are taken into account to perform physical resource scheduling, so as to avoid that a resource management platform creates a virtual machine or performs independent physical resource scheduling without taking account of the operating status of the virtual machine cluster but only according to a resource status of a physical machine cluster, and therefore, to avoid a time delay of virtual machine creation and update incurred by temporary power-up of a physical machine, so that the problem that the QoS of the cloud application cannot be ensured due to the physical resource scheduling of the physical device platform may be solved.

BRIEF DESCRIPTION OF DRAWINGS

To describe the technical solutions in the embodiments of the present invention more clearly, the following briefly describes accompanying drawings required for describing the embodiments. Apparently, the accompanying drawings in the following description show merely some embodiments of the present invention, and persons of ordinary skill in the art may further obtain other drawings according to these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Virtual Machine System

To make embodiments of the present invention be better understood, system architecture of the embodiments of the present invention needs to be introduced. The system architecture may be divided into a cloud application layer, a virtual machine cluster, a physical device platform, and a virtual resource management platform.

The cloud application layer is configured to provide a cloud application program for a user. The cloud application program may include multiple processes. The processes need to be created on a virtual machine. It may be that one process corresponds to one virtual machine, and it may also be that multiple processes correspond to one virtual machine.

The virtual machine cluster is formed of a virtual machine, and virtual machine serving one same cloud application forms a virtual machine cluster. A resource of a virtual machine is provided by a physical machine on the physical device platform. It may be that one virtual machine corresponds to one physical machine, and it may also be that multiple virtual machines correspond to one physical machine.

The physical device platform includes at least one physical machine, and is configured to provide physical resources that needs to be used by a virtual machine, and provide a physical entity for a cloud application.

Figure 1:
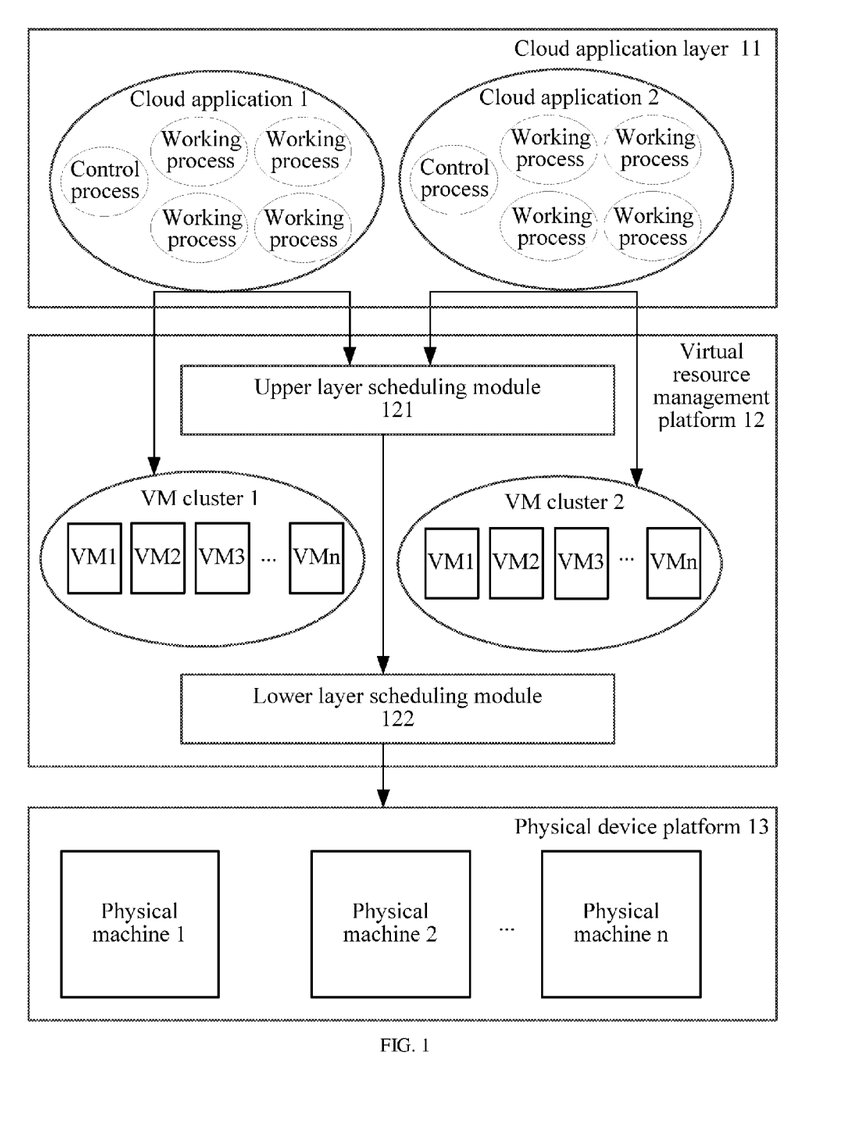
FIG. 1 is a schematic composition diagram of a virtual machine system according to Embodiment 1 of the present invention.

The virtual resource management platform creates at least one virtual machine for each cloud application according to physical resources provided by the physical device platform, and meanwhile, is responsible for scheduling of the virtual machine cluster, monitors an operating status of the cloud application, that is, monitors an operating status of the virtual machine cluster, and when QoS of the cloud application of the cloud application layer cannot be ensured, schedules a new virtual machine for the virtual machine cluster or performs capacity expansion on an existing virtual machine, to ensure the QoS of the cloud application program; further, according to a status of use of the physical resource, performs energy consumption management or physical resource scheduling on the physical machine in the cluster. As shown in FIG. 1, FIG. 1 is an example of an architecture diagram of a virtual machine system according to Embodiment 1 of the present invention. A cloud application layer 11 in the example includes a cloud application 1 and a cloud application 2. Each cloud application, for example, includes one control process and multiple working processes. In this embodiment, only two cloud applications are taken as an example, and it should be fully understood by persons skilled in the art that, according to an actual working situation, the system may also support more cloud applications or only one cloud application running in the system. Specifically, types of the cloud applications may include a desktop cloud VDI service, a data analysis service or a website service, or the like.

A virtual resource management platform 12 may be implemented by one or more software components or modules, and is configured to create a virtual machine VM for each type of cloud application in the cloud application layer 11. When creating the VM, the virtual resource management platform 12 further allocates physical resources in a physical device platform 13 to each VM. All VMs corresponding to one cloud application form a virtual machine cluster (VM Cluster). In this embodiment, corresponding to the cloud application 1 and the cloud application 2 included in the cloud application layer 11, the virtual resource management platform creates a VM Cluster1 and a VM Cluster2. The VM Cluster1 corresponds to the cloud application 1, and the VM Cluster1 includes multiple virtual machines. The VM Cluster2 corresponds to the cloud application 2, and the VM Cluster2 includes multiple virtual machines. After creating the VM Cluster for the cloud application, the virtual resource management platform 12 further monitors operating status information of the cloud application, performs scheduling on the number of VMs in the VM Cluster or a configuration of the VMs in the VM Cluster, obtains a QoS constraint parameter of the VM Cluster and a current operating status statistical indicator of the VM Cluster, and according to the QoS constraint parameter of the VM Cluster and the current operating status statistical indicator of the VM Cluster, adjusts physical resources scheduling policy of the physical device platform or performs physical resource scheduling on the physical device platform.

A physical machine cluster on the physical device platform 13 includes one or more physical machines. In this embodiment, that the physical machine cluster includes three physical machines is taken as an example. A physical resource provided by the physical machine cluster may include one or more of a CPU resource, a memory resource, a storage resource and a network resource. Multiple virtual machines are abstracted by the virtual resource management platform 12 from physical resources provided by the physical device platform 13, and are allocated to the VM Cluster to serve a corresponding cloud application.

In this embodiment which is one of the embodiments of the present invention, the virtual resource management platform 12 may specifically include an upper layer scheduling module 121 and a lower layer scheduling module 122. How the upper layer scheduling module 121 or the lower layer scheduling module 122 performs scheduling work is described in detail in the following subsequent embodiments in the specification.

QoS Constraint Parameter of Virtual Machine Cluster

One VM Cluster may be regarded as a virtual resource pool. A physical resource in the resource pool is used to serve one same cloud application. Therefore, in order to ensure QoS of the cloud application, a virtual resource management platform in the embodiment of the present invention further needs to take account of a QoS constraint parameter of a VM Cluster corresponding to the cloud application.

The QoS constraint parameter of the VM Cluster in the embodiment of the present invention may include one or more of a constraint parameter of total occupied resources constraint parameter of total occupied resources of the VM Cluster, a resource average utilization rate constraint parameter of the VM Cluster, and an average communication delay constraint parameter of the VM Cluster. The constraint parameter may be a specific range of values, for example, upper and lower limits, and may also be any one of a minimum value or a maximum value, for example, an upper limit or a lower limit. For example, the constraint parameter of total occupied resources of the VM Cluster may be upper and lower limits of total memories that all VMs in the VM Cluster are allowed to occupy, or upper and lower limits of the total number of virtual central processing units (Virtual Central Processing Unit, VCPU) that all VMs in the VM Cluster are allowed to occupy, or upper and lower limits of the total number of VMs that can be created in the VM Cluster. The resource average utilization rate constraint parameter of the VM Cluster may be upper and lower limits of an average utilization rate of memories occupied by all VMs in the VM Cluster, or upper and lower limits of an average utilization rate of CPUs occupied by all VMs in the VM Cluster. The average communication delay constraint parameter of the VM Cluster may be upper and lower limits allowed for an average communication delay of all VMs in the VM Cluster.

It should be understood that the foregoing description of the QoS constraint parameter of the VM Cluster is only exemplary, and the resource is, for example, the memory or CPU which is taken as an example. Persons skilled in the art can absolutely extend, according to the foregoing description, the QoS constraint parameter of the VM Cluster mentioned in the present invention to all parameters that can affect the QoS of the VM Cluster and have cluster properties. In addition, in this embodiment, the VCPU is adopted to indicate a unit of measure of the CPU of the VM. A specific size of a VCPU may refer to any universal unit of CPU computing power in the art, for example, MIPS (million instructions per second) or MHz (megahertz).

QoS Policy of Virtual Machine

A QoS policy of a virtual machine includes one or more of a VM region constraint parameter, a VM residence constraint parameter, a VM association constraint parameter, or a VM mutual exclusion constraint parameter. The VM region constraint parameter indicates that a specified virtual machine can only be created and migrated on a specified range of physical machines, so as to ensure security or a resource of a cloud application. The VM residence constraint parameter indicates that a specified virtual machine is very important and cannot be automatically migrated. If migration is needed, an administrator is notified, and manual determination is performed. The VM association constraint parameter indicates that multiple specified virtual machines need to be placed on a same physical machine, so as to improve QoS of communication. Multiple virtual machines specified by the VM mutual exclusion constraint parameter cannot be placed on a same physical machine, so as to improve reliability of an application.

Resource Management Policy of Embodiment of Present Invention

Based on the QoS constraint parameter of the virtual machine cluster and the QoS policy of the virtual machine that are mentioned above, in the embodiment of the present invention, in order to solve a problem that QoS of a cloud application cannot be ensured due to physical resource scheduling of a physical device platform, a resource management platform needs to obtain both or either of the QoS constraint parameter and the QoS policy of the virtual machine, and create or update a resource of the virtual machine accordingly, or adjust physical resources scheduling policy of the physical device platform, or perform physical resource scheduling on the physical device platform.

For example, in the foregoing virtual machine system shown in FIG. 1, the virtual resource management platform may obtain the QoS constraint parameter of the virtual machine cluster and the current operating status statistical indicator of the virtual machine cluster, and according to the QoS constraint parameter of the virtual machine cluster and the current operating status statistical indicator of the virtual machine cluster, adjust the physical resource scheduling policy of the physical device platform or perform the physical resource scheduling on the physical device platform.

In a specific embodiment, an upper layer scheduling module of the resource management platform may provide both or either of the QoS constraint parameter of the virtual machine cluster and the QoS policy of the virtual machine for a lower layer scheduling module, so that the lower layer scheduling module takes them as factors for consideration when the lower layer scheduling module creates a virtual machine, or updates a virtual machine, or performs physical resource scheduling for the purpose of energy consumption management; and meanwhile, take account of the current operating status statistical indicator of the virtual machine cluster, and on the basis of a comparison of the statistical indicator and the factors for consideration, create or update the resource of the virtual machine, or adjust the physical resource scheduling policy of the physical device platform, or perform the physical resource scheduling on the physical device platform.

According to the resource management policy of the embodiment of the present invention, the QoS constraint parameter of the virtual machine cluster is taken into account to perform the physical resource scheduling, so as to avoid that the resource management platform creates a virtual machine or performs independent physical resource scheduling without taking account of the operating status of the virtual machine cluster but only according to the resource status of the physical machine cluster, and therefore, to avoid a time delay of virtual machine creation and update incurred by temporary power-up of a physical machine, so that the problem that the QoS of the cloud application cannot be ensured due to the physical resource scheduling of the physical device platform may be solved, and meanwhile, the resource management of the physical machine is further optimized, thereby avoiding a waste of energy consumption incurred by repeated power-up and power-down of the physical machine.

On the other hand, the QoS policy of the virtual machine also becomes a factor for consideration of physical resource mobilization, so as to ensure that a virtual machine is created on a correct physical machine, ensure the security or the resource of the cloud application, and improve QoS of communication.

A resource management method in the embodiment of the present invention in an automatic monitoring process in a deployment process, an update process and an operation process of a cloud application is introduced in the following.

Figure 2:
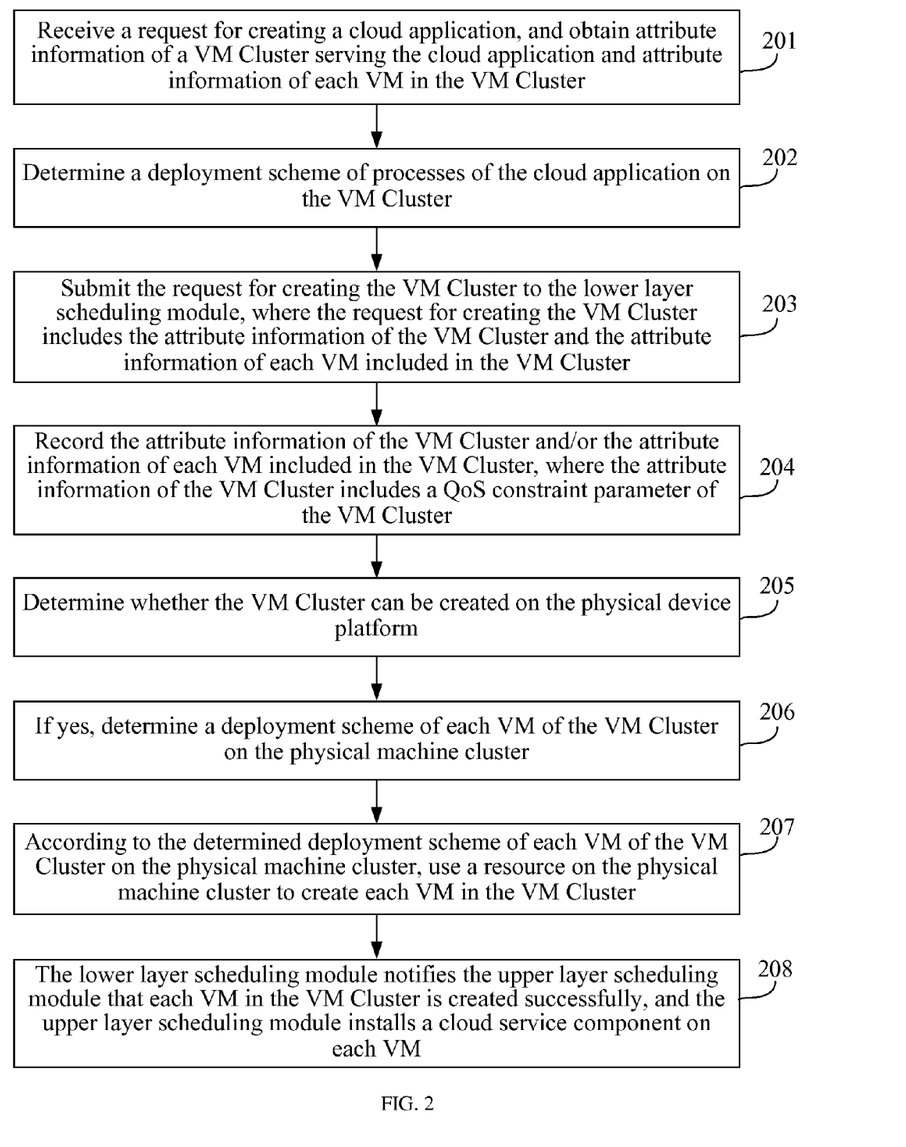
FIG. 2 is a schematic flowchart of a deployment process of a cloud application according to Embodiment 2 of the present invention.

Creation of Virtual Machine Cluster in Deployment Process of Cloud Application In an embodiment of the present invention, as shown in FIG. 2, a resource scheduling workflow of an upper layer scheduling module and a lower layer scheduling module in a deployment process of a cloud application may include:

Step 201: Receive a request for creating a cloud application, and obtain attribute information of a VM Cluster serving the cloud application and attribute information of each VM in the VM Cluster. The attribute information of the VM Cluster includes identifier information of the VM Cluster, the number of VMs included in the VM Cluster, a network topological relationship between the VMs, and a QoS constraint parameter of the VM Cluster. The attribute information of each VM includes specifications of each VM (that is, a resource configuration situation of the VM, for example, a size of a memory or the number of VCPUs of the VM) and a QoS policy of the VM.

Specifically, the QoS constraint parameter of the VM Cluster in this embodiment may include any one or more of the flowing parameters: an upper limit value and a lower limit value of a total memory that may be occupied by the VM Cluster, an upper limit value of a CPU average utilization rate of the VM Cluster, and an upper limit value of an average communication delay of the VM Cluster.

For example, attribute information of a VM Cluster of a cloud application 1 to be created is as follows:
  VM cluster identifier: VMCluster1;
  the number of VMs: 3;
  VM image: image1;
  the QoS constraint parameter of the VM Cluster:
    (1) a total occupied memory of the VM Cluster: an upper limit is 500 G, and a lower limit is 100 G;
    (2) the CPU average utilization rate of the VM Cluster: an average CPU utilization rate of the VM Cluster1 is less than 20%; and
    (3) the average communication delay of the VM Cluster: less than 1s.
  The attribute information of each VM is as follows:
  VM specifications: VM1 (2 VCPUs, and a memory of 60 G);
  VM2 (2 VCPUs, and a memory of 60 G); and
  VM3 (2 VCPUs, and a memory of 40 G).
  The QoS policy of the VM:
    (1) a VM region constraint parameter: all VMs have to run on a physical machine with a remaining memory greater than 20 G;
    (2) a VM residence constraint parameter: all VMs may be migrated;
    (3) a VM association constraint parameter: the VM1 and the VM2 need to run on a same physical machine; and
    (4) a VM mutual exclusion constraint parameter: the VM3 and the VM1 each need to run on a different physical machine.

The attribute information of the VM Cluster and the attribute information of each VM that are obtained in the foregoing may be directly specified in a cloud application template created by a user, and may also be determined according to both information of the cloud application to be created and a preset policy, which is not limited in the embodiment of the present invention.

Step 202: The upper layer scheduling module determines a deployment scheme of processes of the cloud application on the VM Cluster according to a pre-configured VM deployment policy (which is an optional item in this embodiment, and may not be used as a reference item if the policy configuration does not exist), the attribute information of the VM Cluster, and the attribute information of each VM.

For example, the deployment scheme of the processes of the cloud application on the VM Cluster (that is, application process topology information) is:
  a control process group CtrlGroup, a member: CtrlProc;
  a working process group WorkerGroup, members: WorkerProc#; indicating that names of member processes are WorkerProc1, WorkerProc2, and WorkerProc3;
    the VM where CtrlProc is located: VMCluster1.VM1;
    the VM where WorkerProc1 is located: VMCluster1.VM2;
    the VM where WorkerProc2 is located: VMCluster1.VM2; and
    the VM where WorkerProc3 is located: VMCluster1.VM3.

Step 203: The upper layer scheduling module submits the request for creating the VM Cluster to the lower layer scheduling module. The request for creating the VM Cluster includes the attribute information of the VM Cluster and the attribute information of each VM included in the VM Cluster.

Step 204: The lower layer scheduling module records the attribute information of the VM Cluster and/or the attribute information of each VM included in the VM Cluster.

Step 205: The lower layer scheduling module inquires state information of physical resources on a current physical device platform (which may include a resource utilization rate of each physical machine, a topological relationship, or the number of available resources, or the like), determines, according to the state information of the physical resource on the current physical device platform, the attribute information of the VM Cluster and the attribute information of each VM, whether the VM Cluster can be created on the physical device platform; if not, returns a failure response message to the upper layer scheduling module, and if yes, performs step 206.

Specifically, in the embodiment of the present invention, the attribute information of the VM Cluster that is transferred by the upper layer scheduling module to the lower layer scheduling module includes the QoS constraint parameter of the VM Cluster, so that in this step, the lower layer scheduling module may further determine whether the VM Cluster can be created on the physical machine cluster. For example, if a current remaining memory amount of the physical machine cluster is less than or equal to the lower limit value of the total memory that may be occupied by the VM Cluster, the lower layer scheduling module may determine accordingly that creation of the VM Cluster on the physical machine cluster cannot possibly satisfy the QoS of the cloud application, and therefore, determine that the VM Cluster cannot be created on the physical machine cluster.

In specific practice, step 205 is optionally performed. In most situations, a remaining resource and capability of a physical machine cluster all can satisfy a requirement on initial deployment of a VM Cluster. When the attribute information of the VM Cluster includes the lower limit value of total resources that may be occupied by the VM Cluster, this step is conditionally performed, so as to further optimize performance of a scheduling module, and ensure the QoS of the cloud application served by the created VM Cluster.

Step 206: The lower layer scheduling module determines a deployment scheme of each VM of the VM Cluster on the physical machine cluster according to the state information of the physical resource on the current physical device platform and the attribute information of each VM.

Specifically, for example, current resource utilization situations of physical machines included in the physical machine cluster are as follows:
  PM1: a total memory: 150 G, an occupied memory: 10 G; total VCPUs: 50, occupied VCPUs: 5;
  PM2: a total memory: 150 G, an occupied memory: 20 G; total VCPUs: 50, occupied VCPUs: 10; and
  PM3: a total memory: 150 G, an occupied memory: 0 G; total VCPUs: 50, occupied VCPUs: 0.

The deployment scheme of each VM of the VM Cluster on the physical machine cluster that is determined according to the attribute information of the VM Cluster and the situations of the foregoing physical machines is as follows:
  VM1: specifications (2 VCPUs, a memory of 60 G), a PM where the VM1 is located (PM1);

VM2: specifications (2 VCPUs, a memory of 40 G), a PM where the VM2 is located (PM1); and VM3: specifications (2 VCPUs, a memory of 60 G), a PM where the VM3 is located (PM2).

According to the VM association constraint parameter, the VM1 and the VM2 are deployed to run on the same physical machine PM1, and according to the VM mutual exclusion constraint parameter, the VM3 and the VM1 are deployed to run on different physical machines, the PM1 and the PM2, respectively.

Step 207: According to the determined deployment scheme of each VM of the VM Cluster on the physical machine cluster, the lower layer scheduling module uses a resource on the physical machine cluster to create each VM in the VM Cluster.

Step 208: The lower layer scheduling module notifies the upper layer scheduling module that each VM in the VM Cluster is created successfully, and the upper layer scheduling module installs a cloud service component on each VM, and according to the deployment scheme of the processes of the cloud application on the VM Cluster that is determined in step 202, loads a corresponding process on each VM.

At this point, the deployment process of the cloud application is completed, and each process of the cloud application runs on the corresponding VM. In the deployment process of the cloud application, the resource management platform obtains the attribute information of the VM Cluster, both or either of the QoS constraint parameter of the VM Cluster and the QoS policy of the VM that are included in the attribute information of each VM in the VM Cluster, and factors for consideration for scheduling that may be used in a subsequent resource monitoring process, and meanwhile, determines, according to the QoS constraint parameter of the VM Cluster, whether the VM Cluster to be created can be created on the physical device platform, so as to avoid unnecessary process waste, improve a creation delay of the virtual machine cluster, and facilitate an assurance of the QoS.

Update of Virtual Machine Cluster in Operation Process of Cloud Application

After deployment of a cloud application is completed, upper and lower layer scheduling modules both start corresponding resource scheduling work. Specifically, the upper layer scheduling module starts to monitor process information of the cloud application, obtains operating information of a VM Cluster serving the cloud application, and determines, according to a preset policy, to perform scheduling on the number of VMs in the VM Cluster or a resource configuration of the VMs in the VM Cluster, for example, to add or reduce a VM, and perform capacity expansion or capacity deduction for an existing VM. The lower layer scheduling module schedules physical resources according to an instruction from the upper layer scheduling module, so as to add or delete a VM, or perform capacity expansion or capacity deduction for an existing VM.

Figure 3:
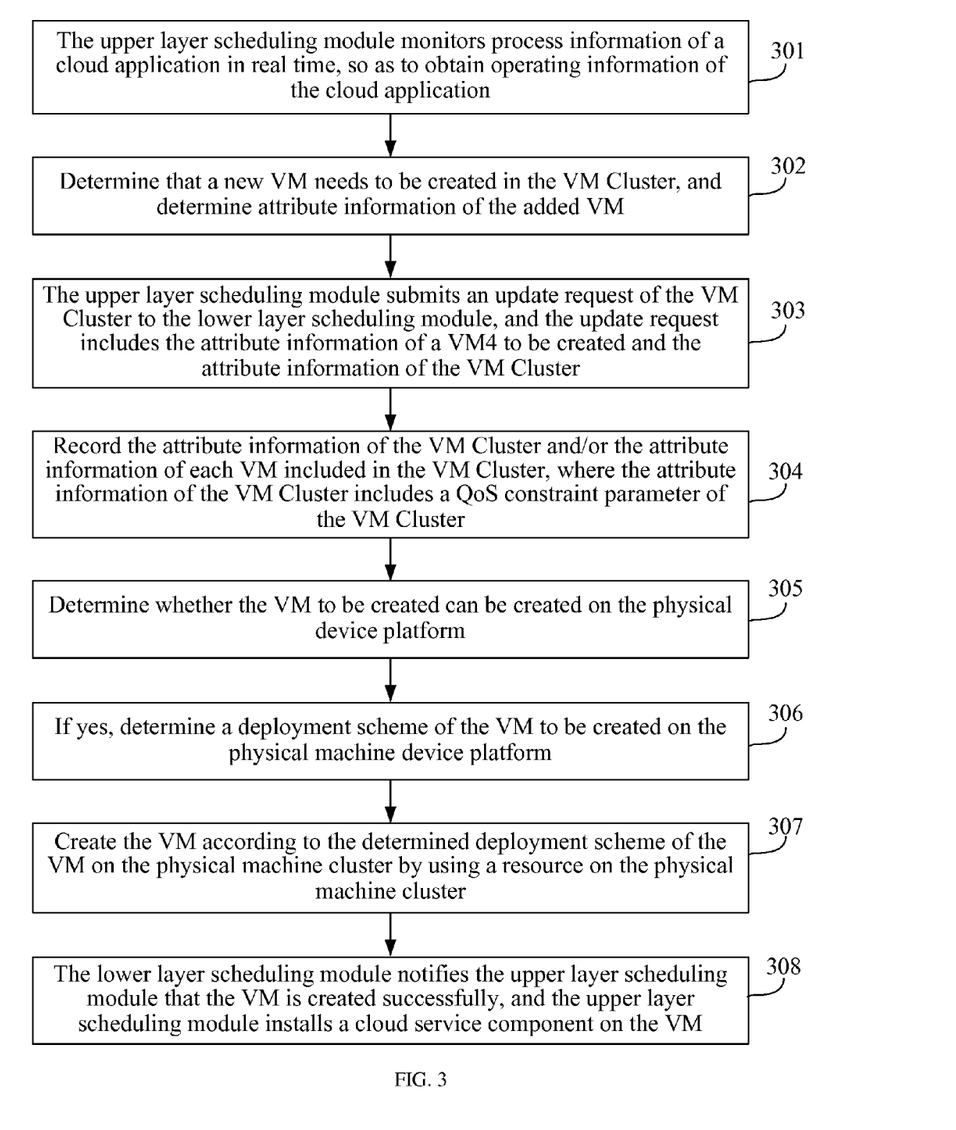
FIG. 3 is a schematic flowchart of resource update in an operation process of a cloud application according to Embodiment 3 of the present invention.

As shown in FIG. 3, in an embodiment of the present invention, a resource scheduling workflow of the upper layer scheduling module in an operation process of a cloud application may include:

Step 301: The upper layer scheduling module monitors process information of a cloud application in real time, so as to obtain operating information of the cloud application.

For example, the following operating information of the cloud application is obtained:

an application name: App1;
a VM cluster where the application is located: VM Cluster1;
application process topology information:
a control process group CtrlGroup, a member: CtrlProc;
a working process group WorkerGroup, members: WorkerProc#; indicating that names of member processes are WorkerProc1, WorkerProc2, and WorkerProc3;
the VM where CtrlProc is located: VMCluster1.VM1;
the VM where WorkerProc1 is located: VMCluster1.VM2;
the VM where WorkerProc2 is located: VMCluster1.VM2;
the VM where WorkerProc3 is located: VMCluster1.VM3;
application resource occupation information:
a current physical memory of WorkerProc1: 10 G;
a current physical memory of WorkerProc2: 20 G;
a current physical memory of WorkerProc3: 30 G;
a remaining memory of the VM1: 30 G;
a remaining memory of the VM2: 30 G;
a remaining memory of the VM3: 10 G; and
an application resource demand: a demand of a total memory of WorkerGroup is greater than 100 G.

Step 302: The upper layer scheduling module, according to the obtained operating information of the cloud application and a preset resource scheduling policy, determines that a new VM needs to be created in the VM Cluster, and determines attribute information of the added VM.

For example, the upper layer scheduling module determines that a resource demand of a current cloud application (100 G) is far greater than a current working memory of WorkerProc1-3 (10 G+20 G+30 G=60 G), and therefore, decides to add one process WorkerProc4, and requires that WorkerProc4 can occupy a memory greater than 40 G. However, the upper layer scheduling module inquires to find that no VM with an idle memory greater than 40 G is currently available, and therefore, decides to create a new VM.

Attribute information of the newly added VM is as follows:
VM name: VM4;
VM specifications: VM4 (2 VCPUs, and a memory of 40 G);
a QoS policy of the VM:
(1) a VM region constraint parameter: the VM4 has to run on a physical machine with a remaining memory greater than 20 G;
(2) a VM residence constraint parameter: the VM4 may be migrated;
(3) a VM association constraint parameter: the VM4 and the VM3 need to run on a same physical machine; and
(4) a VM mutual exclusion constraint parameter: the VM4 and the VM1 each need to run on a different physical machine.

Further, in this step, the upper layer scheduling module further updates the attribute information of the VM Cluster1 according to the attribute information of the VM4 to be added, for example:
VM cluster identifier: VMCluster1;
the number of VMs: 4;
VM image: image1;
a QoS constraint parameter of the VM Cluster:
(1) a total occupied memory of the VM Cluster: an upper limit is 500 G, and a lower limit is 100 G;
(2) a CPU average utilization rate of the VM Cluster: an average CPU utilization rate of the VM Cluster1 is less than 20%; and
(3) an average communication delay of the VM Cluster: less than 1s.

Step 303: The upper layer scheduling module submits a request for creating the VM4, that is, an update request of the VM Cluster to the lower layer scheduling module (after the request for creating the VM4 is executed, a resource configuration of the VM Cluster where it is located is updated, so that the request for creating the VM4 in the embodiment of the present invention may be construed as the update request of the VM Cluster). The update request includes the attribute information of the VM4 to be created and attribute information of the VM Cluster where the VM4 to be created is located, that is, updated attribute information of the VM Cluster1.

In the foregoing embodiment, increasing the number of VMs is taken as an example, and in other embodiments, resource scheduling of the upper layer scheduling module may further include a decrease in the number of VMs, and capacity expansion or capacity deduction performed on an existing VM. Specific implementation manners are not repeatedly described herein.

Step 304: The lower layer scheduling module records the attribute information of the VM4 to be created and the attribute information of the VM Cluster where the VM4 to be created is located.

Further, the lower layer scheduling module may further obtain state information of physical resources on a current physical device platform and operating information of the VM Cluster1 where the VM to be created is located.

Specifically, the lower layer scheduling module may collect statistics about the operating information of the VM Cluster1 regularly after the VM Cluster1 is deployed, and may also start to collect statistics about the operating information of the VM Cluster1 after receiving the request for creating the VM4. The embodiment of the present invention does not limit a specific implementation manner of when or how the lower layer scheduling module obtains the operating information of the VM Cluster1, and persons skilled in the art may perform implementation in multiple manners.

An example of the operating information of the VM Cluster1 obtained by the lower layer scheduling module is as follows:

member VMs: VM1, VM2, and VM3;
VM information: VM1 (2 VCPUs, a memory of 60 G), a PM where the VM1 is located (PM1);
  VM2 (2 VCPUs, a memory of 60 G), a PM where the VM2 is located (PM1); and
  VM3 (2 VCPUs, a memory of 40 G), a PM where the VM3 is located (PM2).

An example of the state information of the physical resource on the current physical device platform that is obtained by the lower layer scheduling module is as follows:

PM1: a total memory: 150 G, an occupied memory: 130 G; total VCPUs: 50, occupied VCPUs: 9;
PM2: a total memory: 150 G, an occupied memory: 60 G; total VCPUs: 50, occupied VCPUs: 12; and
PM3: a total memory: 150 G, an occupied memory: 0 G; total VCPUs: 50, occupied VCPUs: 0.

Step 305: The lower layer scheduling module determines, according to the state information of the physical resource on the current physical device platform, the operating information of the VM Cluster1, the updated attribute information of the VM Cluster 1, and the attribute information of the VM4 to be created, whether the VM4 can be created on the physical device platform; if not, returns a failure response message to the upper layer scheduling module, and if yes, performs step 306.

Specifically, in the embodiment of the present invention, the attribute information of the VM Cluster 1 that is transferred by the upper layer scheduling module to the lower layer scheduling module includes the QoS constraint parameter of the VM Cluster1, so that in this step, the lower layer scheduling module may further determine whether the VM 4 can be created on the physical machine cluster. For example, if a total occupied memory of the VM Cluster exceeds the upper limit value of the total occupied memory of the VM Cluster in the QoS constraint parameter of the VM Cluster after the VM4 is created, the lower layer scheduling module may determine accordingly that the VM 4 cannot be created on the physical machine cluster.

In specific practice, step 305 is optionally performed.

Step 306: The lower layer scheduling module determines a deployment scheme of the VM 4 on the physical device platform according to the state information of the physical resource on the current physical device platform, the operating information of the VM Cluster1, the updated attribute information of the VM Cluster1, and the attribute information of the VM4 to be created.

Specifically, according to a region constraint parameter of the VM4, the VM4 needs to be deployed on a physical machine with a remaining memory greater than 20 G; according to an association constraint parameter of the VM4, the VM4 and the VM3 are deployed to run on a same physical machine PM2; according to a mutual exclusion constraint parameter of the VM4, the VM4 and the VM1 are deployed to run on different physical machines, the PM2 and the PM1, respectively.

Step 307: The lower layer scheduling module creates the VM4 according to the determined deployment scheme of the VM 4 on the physical machine cluster.

Step 308: The lower layer scheduling module notifies the upper layer scheduling module that the VM 4 is created successfully, and the upper layer scheduling module installs a cloud service component on the VM4, and loads a corresponding process on the VM4.

At the point, the update process of the virtual machine cluster in the operation process of the cloud application is completed. In the update process of the virtual cluster of the cloud application, the resource management platform obtains the updated attribute information of the VM Cluster, both or either of an updated QoS constraint parameter of the VM Cluster and an updated QoS policy of the VM that are included in the attribute information of each VM in the VM Cluster, and factors for consideration for scheduling that may be used in a subsequent resource monitoring process, and meanwhile, determines, according to the updated QoS constraint parameter of the VM Cluster, whether the VM Cluster to be created can be created on the physical device platform, so as to avoid unnecessary process waste, improve a creation delay of the virtual machine cluster, and facilitate an assurance of the QoS.

Resource Management in Operation Process of Cloud Application

In a creation process of a virtual machine cluster when a cloud application is deployed and in an update process of the virtual machine cluster when the cloud application is running, a virtual resource management platform (which is a lower layer scheduling module of the virtual resource management platform in a specific embodiment) obtains and records a QoS constraint parameter of the virtual machine cluster, so that after a VM Cluster is deployed for the cloud application, the virtual resource management platform may collect statistics about operating information of a VM Cluster1 regularly or at any time, and may also start to collect statistics about operating information of the VM Cluster after receiving a resource monitoring trigger message from another management module. The embodiment of the present invention does not limit a specific implementation manner of when the virtual resource management platform obtains the operating information of the VM Cluster, and persons skilled in the art may perform implementation in multiple manners. Physical resource scheduling or modification of physical resources scheduling policy may be performed according to information obtained through statistics collecting and the recorded QoS constraint parameter of the virtual machine cluster.

Figure 4:
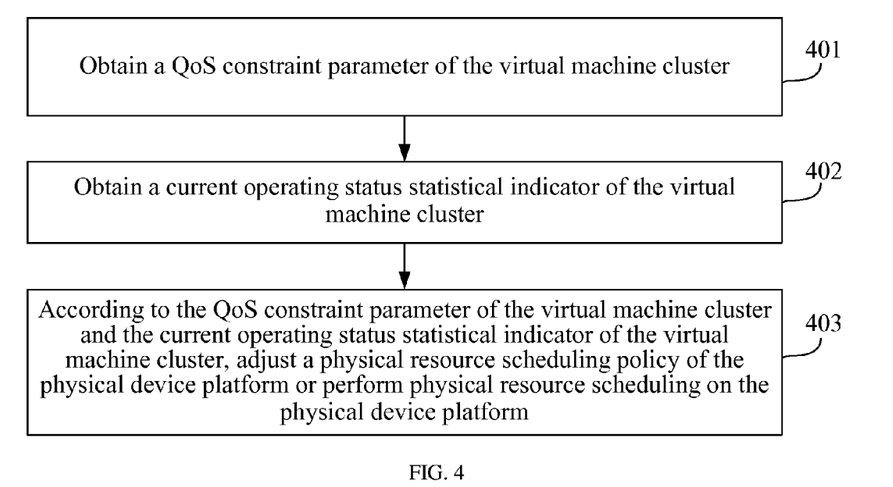
FIG. 4 is a schematic flowchart of resource management of a virtual machine system according to Embodiment 4 of the present invention.

In the embodiment of the present invention, as shown in FIG. 4, a specific implementation manner may include:

Step 401: Obtain a QoS constraint parameter of the virtual machine cluster.

Step 402: Obtain a current operating status statistical indicator of the virtual machine cluster.

Step 403: According to the QoS constraint parameter of the virtual machine cluster and the current operating status statistical indicator of the virtual machine cluster, adjust physical resources scheduling policy of the physical device platform or perform physical resource scheduling on the physical device platform.

According to the resource management method of the embodiment of the present invention, the QoS constraint parameter of the virtual machine cluster is taken into account to perform the physical resource scheduling, so as to avoid that a resource management platform creates a virtual machine without taking account of the operating status of the virtual machine cluster but only according to the resource status of the physical machine cluster, or avoid that a resource management platform performs independent physical resource scheduling, and therefore, to avoid a delay of virtual machine creation and update incurred by temporary power-up of a physical machine, so that a problem that QoS of the cloud application cannot be ensured due to the physical resource scheduling of the physical device platform may be solved, and meanwhile, the resource management of the physical machine is further optimized, thereby avoiding a waste of energy consumption incurred by repeated power-up and power-down of the physical machine.

When the virtual machine resource management of the virtual resource management platform and the physical machine resource management function may not be further divided for processing by different modules, the foregoing embodiment may be executed by the resource management platform. In architecture in which the virtual resource management platform is divided into the upper layer scheduling module which performs virtual machine resource management and the lower layer scheduling module which performs physical machine resource management, an execution entity of the foregoing embodiment is the lower layer scheduling module.

Figure 5:
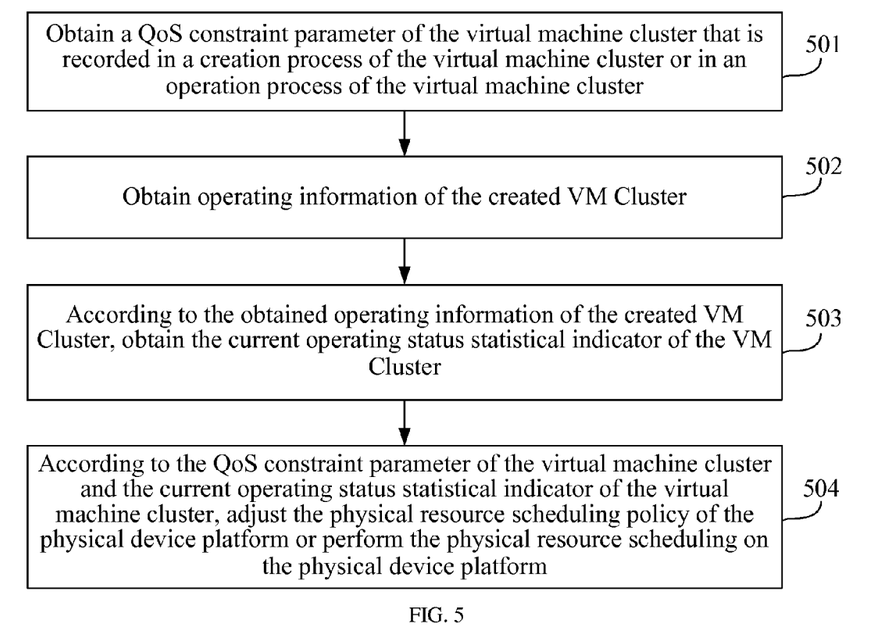
FIG. 5 is a schematic flowchart of resource management of a virtual machine system according to Embodiment 5 of the present invention.

As in the foregoing embodiment, in the architecture in which the virtual resource management platform is divided into the upper and lower layer scheduling modules, as shown in FIG. 5, a specific implementation manner of an implementable embodiment includes the following steps.

Step 501: Obtain a QoS constraint parameter of the virtual machine cluster recorded in a creation process of the virtual machine cluster or in an operation process of the virtual machine cluster.

For example, the QoS constraint parameter of the VM Cluster1 recorded in step 204 or 304 is obtained.

Step 502: The lower layer scheduling module obtains operating information of a cloud application, that is, obtains operating information of a created VM Cluster. For example, for a cloud application 1 mentioned in the foregoing embodiment, the operating information of the VM Cluster1 is obtained.

The lower layer scheduling module may obtain the operating information of the VM Cluster1 regularly after the VM Cluster1 is deployed, may also start to obtain the operating information of the VM Cluster1 according to trigger of a relevant message, and may also obtain the operating information in real time. The embodiment of the present invention does not limit a specific implementation manner of when the lower layer scheduling module obtains the operating information of the VM Cluster1, and persons skilled in the art may perform implementation in multiple manners.

Further, the lower layer scheduling module may also obtain use state information of physical resources on a current physical device platform when obtaining the operating information of the created VM Cluster.

Step 503: The lower layer scheduling module obtains, according to the obtained operating information of the created VM Cluster, the current operating status statistical indicator of the VM Cluster.

The operating status statistical indicator may include one or more of a sum, a largest value, a smallest value, an average value, and a variance of statistical parameters, and specifically may include:

(1) a statistical value of a current resource average utilization rate of a virtual machine cluster, for example, an average utilization rate of currently occupied memories of all VMs of the VM Cluster or collecting statistics about an average utilization rate of currently occupied CPUs of all VMs of the VM Cluster;

(2) a statistical value of total occupied resources of the virtual machine cluster, for example, a sum value of currently occupied memories or CPUs of all VMs of the VM Cluster; and (3) a statistical value of a current average communication delay of the virtual machine cluster, for example, statistics about a communication delay between any two VMs in the VM Cluster may be collected, and an average value of communication delays may be obtained according to the delays obtained through statistics collecting.

Step 504: The lower layer scheduling module, according to the QoS constraint parameter of the virtual machine cluster and the current operating status statistical indicator of the virtual machine cluster, adjusts the physical resource scheduling policy of the physical device platform or performs the physical resource scheduling on the physical device platform.

In this step, according to the QoS constraint parameter of the virtual machine cluster and the current operating status statistical indicator of the virtual machine cluster, the physical resource scheduling or the modification of the physical resource scheduling policy is performed, so as to ensure the QoS of the VM Cluster.

Specifically, the physical resource scheduling or the modification of the physical resource scheduling policy may be performed in the following several manners.

(1) A physical machine capacity deduction operation on the physical device platform is suppressed.

Physical machine capacity deduction is scheduling work of energy consumption management performed by the lower layer scheduling module according to the obtained use state information of the physical resource of the physical machine cluster. For example, it is set that a physical machine capacity deduction threshold is that a CPU utilization rate is 30%, so that the lower layer scheduling module, according to the obtained use state information of the physical resource of the physical machine device platform, obtains, through statistics collecting, that a CPU average utilization rate of the physical machine cluster is 28%, and therefore, the lower layer scheduling module determines that current use of the physical machine cluster is not saturated, energy consumption reduction may be performed, that is, virtual machine migration is performed to perform full migration and a power-down operation on a certain physical machine, so as to reduce energy consumption.

However, the lower layer scheduling module performs the physical machine capacity deduction operation only according to an actual resource use situation of the physical machine cluster without taking account of that a change in a demand of an upper layer application for the physical resource may incur a resource scheduling conflict. For example, the lower layer scheduling module performs the physical machine capacity deduction operation while the upper layer scheduling module requires an increase in the use of the physical resource. The resource scheduling conflicts may affect the QoS of the cloud application. Therefore, in the embodiment of the present invention, if the lower layer scheduling module determines, according to the QoS constraint parameter of the virtual machine cluster and the current operating status statistical indicator of the virtual machine cluster, that the upper layer scheduling module is about to start to perform resource scheduling of capacity expansion or adding of a new virtual machine on the VM Cluster, the lower layer scheduling module needs to prepare physical resources for this, so that the energy consumption management of physical machine capacity deduction needs to be suspended, so as to suppress the physical machine capacity deduction operation on the physical device platform.

Specifically, if the QoS constraint parameter of the virtual machine cluster includes a resource average utilization rate constraint parameter of the virtual machine cluster, the obtaining the current operating status statistical indicator of the virtual machine cluster in step 503 includes: obtaining the statistical value of the current resource average utilization rate of the virtual machine cluster. Accordingly, in step 504, the lower layer scheduling module compares the statistical value of the current resource average utilization rate of the virtual machine cluster with the resource average utilization rate constraint parameter of the virtual machine cluster, and suppresses the physical machine capacity deduction operation on the physical device platform if the statistical value of the current resource average utilization rate of the virtual machine cluster is smaller than the resource average utilization rate constraint parameter of the virtual machine cluster and a difference between the two is smaller than a set tolerance threshold.

The tolerance threshold may be preset.

Further, two specific implementation manners may be included for suppressing the physical machine capacity deduction operation on the physical device platform. In one manner, the physical resource scheduling policy of the physical device platform is adjusted, for example, the physical machine capacity deduction threshold of the physical device platform is increased. For example, a statistical value of a current CPU average utilization rate of all VMs of the VM Cluster1 is 18%, but a CPU average utilization rate QoS constraint parameter of the VM Cluster is 20%, and a tolerance threshold is 5%. In this case, a difference between the statistical value of the current CPU average utilization rate and the CPU average utilization rate QoS constraint parameter of the VM Cluster is smaller than the tolerance threshold, so that the physical machine capacity deduction threshold may be increased from 30% to 40% being the CPU average utilization rate. In the other manner, the physical machine full migration or power-down operation on the physical device platform is not initiated within a predetermined duration. For example, a timer is started, and the physical machine capacity deduction operation is not executed within a predetermined time until a capacity expansion operation of the virtual machine cluster is completed.

(2) At least one physical machine on the physical device platform is powered up.

If the statistical value of the current resource average utilization rate of the virtual machine cluster is smaller than the resource average utilization rate constraint parameter of the virtual machine cluster, and a difference between the two is smaller than a set tolerance threshold, the lower layer scheduling module may further directly power up at least one physical machine on the physical device platform, so as to prepare the physical resource for the capacity expansion of the virtual machine cluster.

For example, in the foregoing embodiment, memory usage of the PM1 and the PM2 each reaches 130 G (a total resource is 150 G), and the memory average utilization rate of the physical machine cluster is 57%, which is greater than 50%, so as to decide to power up the PM3. In this way, when the lower layer scheduling module subsequently receives an instruction from the upper layer scheduling module and needs to perform a capacity expansion operation, the lower layer scheduling module does not need to start the PM3, so as to decrease the resource scheduling delay of the lower layer scheduling module and accordingly ensure the QoS of the cloud application.

When the QoS constraint parameter of the virtual machine cluster that is obtained in step 501 further includes an upper limit or a lower limit of the total occupied resources of the virtual machine cluster, the obtaining the current operating status statistical indicator of the virtual machine cluster in step 503 further includes: obtaining a statistical value of the currently total occupied resources of the virtual machine cluster. In a further embodiment, the lower layer scheduling module further obtains a difference between the statistical value of the currently total occupied resources of the virtual machine cluster and the upper limit of the total occupied resources of the virtual machine cluster, and according to the difference, selects a physical machine of a corresponding specification to perform a power-up operation. For example, if the statistical value of the currently occupied memory of the virtual machine cluster is 950 G, and its memory constraint parameter with the virtual machine cluster is 1000 G, a physical machine with a memory specification being 100 G may be selected to perform the power-up operation, but a physical machine with the memory specification being 200 G is not selected.

In another further embodiment, the lower layer scheduling module may further obtain current use state information of the physical resource on the physical device platform, and only when a remaining physical resource of a currently used physical machine is not sufficient, execute the operation of powering up at least one physical machine on the physical device platform.

(3) Physical resources scheduling priority level of the virtual machine cluster is raised.

If the statistical value of the current resource average utilization rate of the virtual machine cluster is greater than the resource average utilization rate constraint parameter of the virtual machine cluster, in this case, a speed of the operation of adding a virtual machine to the virtual machine cluster or performing capacity expansion for the virtual machine needs to be increased, and the QoS of the cloud application can be ensured only when the delay of the operation is decreased. In this case, the lower layer scheduling module may further raise the physical resource scheduling priority level of the virtual machine cluster, so as to ensure that when receiving a resource update request of the virtual machine cluster, the lower layer scheduling module processes the resource update request preferentially, thereby ensuring the QoS of the cloud application.

(4) The virtual machine of the virtual machine cluster is centrally deployed on a same physical machine.

When the QoS constraint parameter of the virtual machine cluster that is obtained in step 501 includes the average communication delay constraint parameter of the virtual machine cluster, accordingly, the obtaining the current operating status statistical indicator of the virtual machine cluster in step 503 includes: obtaining a statistical value of the current average communication delay of the virtual machine cluster.

In this case, the lower layer scheduling module compares the statistical value of the current average communication delay of the virtual machine cluster with the average communication delay constraint parameter of the virtual machine cluster. If the statistical value of the current average communication delay of the virtual machine cluster is greater than the average communication delay constraint parameter of the virtual machine cluster, or a difference between the two is smaller than a set tolerance threshold, the virtual machine of the virtual machine cluster is centrally deployed on the same physical machine, so as to decrease the communication delay of the virtual machine cluster, thereby ensuring the QoS of the cloud application.

Figure 6:
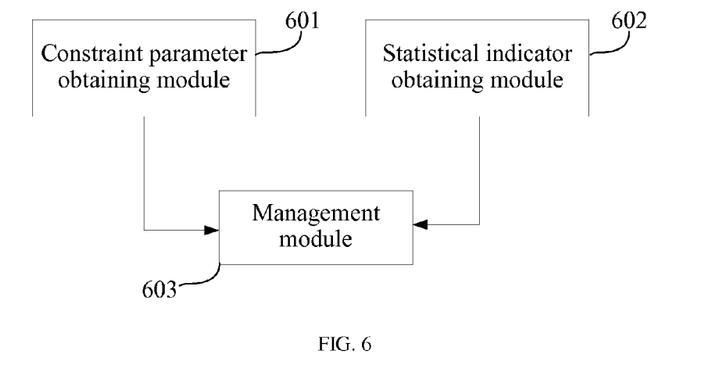
FIG. 6 is a schematic diagram of a resource management apparatus for a virtual machine system according to Embodiment 6 of the present invention.

FIG. 6 is a schematic composition diagram of a structure of a resource management apparatus for a virtual machine system according to an embodiment of the present invention. In the embodiment of the present invention, the resource management apparatus for a virtual machine system is deployed in a virtual machine system. The virtual machine system provides service for at least one cloud application. The system includes a virtual resource management platform and a physical device platform. The physical device platform includes at least one physical machine. The virtual resource management platform creates at least one virtual machine for each cloud application according to physical resources provided by the physical device platform. The at least one virtual machine corresponding to each cloud application forms a virtual machine cluster.

The resource management apparatus for a virtual machine system may include:

a constraint parameter obtaining module 601, configured to obtain a QoS constraint parameter of the virtual machine cluster;

a statistical indicator obtaining module 602, configured to obtain a current operating status statistical indicator of the virtual machine cluster; and a management module 603, configured to, according to the QoS constraint parameter of the virtual machine cluster and the current operating status statistical indicator of the virtual machine cluster, adjust physical resources scheduling policy of the physical device platform or perform physical resource scheduling on the physical device platform.

Specifically, the constraint parameter obtaining module 601 is further configured to, in a creation process of the virtual machine cluster, receive a creation request for creating the virtual machine cluster, or in an operation process of the virtual machine cluster, receive a resource update request of the virtual machine cluster, where the creation request or the update request carries the QoS constraint parameter of the virtual machine cluster; and record the QoS constraint parameter of the virtual machine cluster.

Specifically, the constraint parameter obtaining module 601 is specifically configured to obtain a resource average utilization rate constraint parameter of the virtual machine cluster. The statistical indicator obtaining module 602 is specifically configured to obtain a statistical value of the current resource average utilization rate of the virtual machine cluster. The management module 603 is specifically configured to compare the statistical value of the current resource average utilization rate of the virtual machine cluster with the resource average utilization rate constraint parameter of the virtual machine cluster; if the statistical value of the current resource average utilization rate of the virtual machine cluster is smaller than the resource average utilization rate constraint parameter of the virtual machine cluster and a difference between the two is smaller than a set tolerance threshold, suppress a physical machine capacity deduction operation on the physical device platform, and/or power up at least one physical machine on the physical device platform.

Specifically, the suppressing the physical machine capacity deduction operation on the physical device platform may be that the management module 603 increases a physical machine capacity deduction threshold on the physical device platform, or does not initiate a physical machine full migration or power-down operation on the physical device platform within a predetermined duration.

Specifically, the constraint parameter obtaining module 601 is further configured to obtain an upper limit or a lower limit of total occupied resources of the virtual machine cluster. The statistical indicator obtaining module 602 is further configured to obtain a statistical value of currently total occupied resources of the virtual machine cluster. The management module 603 is specifically configured to obtain a difference between the statistical value of the currently total occupied resources of the virtual machine cluster and the upper limit of the total occupied resources of the virtual machine cluster, and according to the difference, select a physical machine of a corresponding specification to perform a power-up operation.

Specifically, the management module 603 is further configured to, when the statistical value of the current resource average utilization rate of the virtual machine cluster is greater than the resource average utilization rate constraint parameter of the virtual machine cluster, raise physical resources scheduling priority level of the virtual machine cluster.

Specifically, the constraint parameter obtaining module 601 is specifically configured to obtain an average communication delay constraint parameter of the virtual machine cluster. The statistical indicator obtaining module 602 is specifically configured to obtain a statistical value of a current average communication delay of the virtual machine cluster. The management module 603 is specifically configured to compare the statistical value of the current average communication delay of the virtual machine cluster with the average communication delay constraint parameter of the virtual machine cluster, and if the statistical value of the current average communication delay of the virtual machine cluster is greater than the average communication delay constraint parameter of the virtual machine cluster and a difference between the two is smaller than a set tolerance threshold, centrally deploy the virtual machine of the virtual machine cluster on a same physical machine.

Specifically, the QoS constraint parameter of the virtual machine cluster includes a constraint parameter of total occupied resources of the virtual machine cluster. The apparatus further includes a processing module 604, further configured to obtain information of a remaining physical resource on the physical device platform, determine, according to the constraint parameter of total occupied resources of the virtual machine cluster, whether a virtual machine cluster to be created or a virtual machine cluster to be updated can be executed on the physical device platform, and if yes, execute creation or resource update of the virtual machine cluster.

Figure 7:
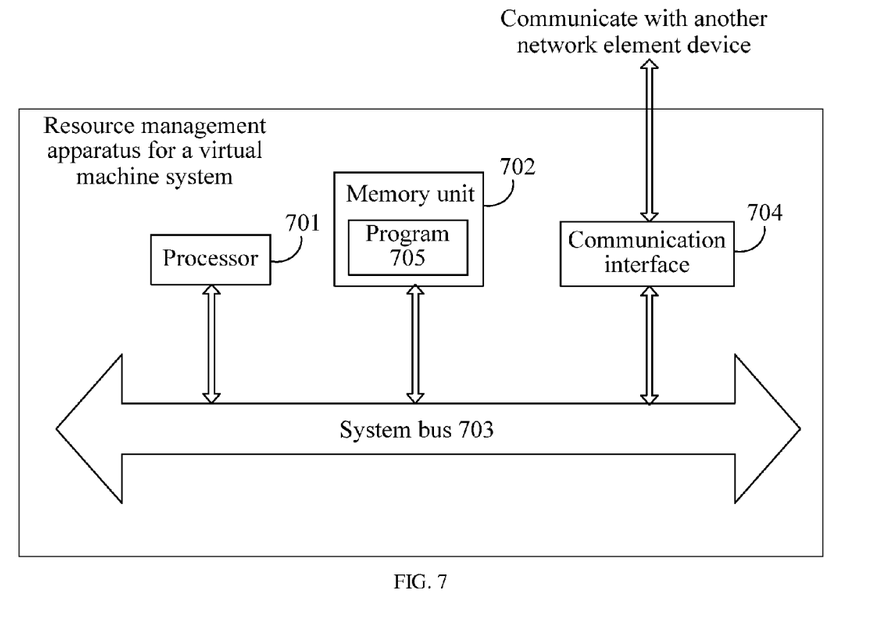
FIG. 7 is a schematic diagram of a resource management apparatus for a virtual machine system according to Embodiment 7 of the present invention.

FIG. 7 is a schematic composition diagram of a structure of a resource management apparatus for a virtual machine system according to an embodiment of the present invention. In the embodiment of the present invention, the resource management apparatus for a virtual machine system is deployed in a virtual machine system. The virtual machine system provides service for at least one cloud application. The system includes a virtual resource management platform and a physical device platform. The physical device platform includes at least one physical machine. The virtual resource management platform creates at least one virtual machine for each cloud application according to physical resources provided by the physical device platform. The at least one virtual machine corresponding to each cloud application forms a virtual machine cluster.

The resource management apparatus for a virtual machine system may include:

a processor 701, a memory unit 702, a system bus 703, and a communication interface 704; where the processor 701, the memory unit 702, and the communication interface 704 are connected and communicate with each other through the system bus 703.

The processor 701 may be a single-core or multi-core central processing unit (Central Processing Unit, CPU), or an application specific integrated circuit (Application Specific Integrated Circuit, ASIC), or configured to be one or more integrated circuits for implementing the embodiment of the present invention.

The memory unit 702 may be a high-speed RAM memory unit, and may also be a non-volatile memory (non-volatile memory), for example, at least one magnetic disk memory unit.

The memory unit 702 is configured to store a program 705. Specifically, the program 705 may include program codes. The program codes include a computer executable instruction.

When the resource management apparatus for a virtual machine system runs, the processor 701 runs the program 705, so as to execute the following instructions:

obtain a QoS constraint parameter of the virtual machine cluster;

obtain a current operating status statistical indicator of the virtual machine cluster; and according to the QoS constraint parameter of the virtual machine cluster and the current operating status statistical indicator of the virtual machine cluster, adjust physical resources scheduling policy of the physical device platform or perform physical resource scheduling on the physical device platform.

Specifically, the resource management apparatus for a virtual machine system further executes the resource management method shown in FIG. 5 according to the instruction, which is not repeatedly described herein.

According to a resource management policy in the embodiment of the present invention, the QoS constraint parameter of the virtual machine cluster is taken into account to perform the physical resource scheduling, so as to avoid that a resource management platform creates a virtual machine or performs independent physical resource scheduling without taking account of the operating status of the virtual machine cluster but only according to the resource status of the physical machine cluster, and therefore, to avoid a delay of virtual machine creation and update incurred by temporary power-up of a physical machine, so that a problem that QoS of the cloud application cannot be ensured due to the physical resource scheduling of the physical device platform may be solved, and meanwhile, the resource management of the physical machine is further optimized, thereby avoiding a waste of energy consumption incurred by repeated power-up and power-down of the physical machine.

On the other hand, the QoS policy of the virtual machine also becomes a factor for consideration of mobilization of physical resources, so as to ensure that a virtual machine is created on a correct physical machine, ensure security or a resource of the cloud application, and improve QoS of communication.

It may be clearly understood by persons skilled in the art that, for the purpose of convenient and brief description, for a specific working process of the foregoing system, device and unit, reference may be made to the corresponding process in the foregoing method embodiments, and details are not repeatedly described herein.

It may be understood by persons of ordinary skill in the art that the accompanying drawings are merely schematic diagrams of an embodiment, and units or processes in the accompanying drawings are not necessarily required for implementing the present invention.

In the several embodiments provided in the present application, it should be understood that the disclosed system, device, and method may be implemented in other manners. For example, the device embodiment described above is merely exemplary. For example, dividing of the units is merely a kind of logical function dividing, and there may be other dividing manners in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the devices or units may be implemented in electronic, mechanical or other forms.

The units described as separate parts may or may not be physically separated, and parts displayed as units may or may not be physical units, may be located in one position, or may also be distributed on a plurality of network units. A part or all of the units may be selected according to actual needs to achieve the objectives of the solutions of the embodiments.

In addition, functional units in the embodiments of the present invention may be integrated into one processing unit, each of the units may also exist alone physically, and two or more than two units may also be integrated into one unit. The integrated unit may be implemented in a form of hardware, and may also be implemented in a form of hardware plus a software functional unit.

The integrated unit implemented in the form of the software functional unit may be stored in a computer readable storage medium. The software functional unit is stored in a storage medium, and includes several instructions used for instructing a computer device (which may be a personal computer, a server, or a network device, or the like) to perform a part of the steps of the methods in the embodiments of the present invention. The storage medium includes any medium that is capable of storing program codes, such as a USB flash disk, a removable hard disk, a read-only memory (Read-Only memory, ROM for short), a random access memory (Random Access Memory, RAM for short), a magnetic disk, or an optical disk.

Finally, it should be noted that the foregoing embodiments are merely intended for describing the technical solutions of the present invention rather than limiting the present invention.

Although the present invention is described in detail with reference to the foregoing embodiments, persons of ordinary skill in the art should understand that they may still make modifications to the technical solutions described in the foregoing embodiments or make equivalent replacements to a part of the technical features of the technical solutions described in the foregoing embodiments; however, these modifications or replacements do not make the essence of the corresponding technical solutions depart from the spirit and scope of the technical solutions in the embodiments of the present invention.

What is claimed is:

1. A resource management method in a computer system, wherein the computer system comprises a physical device platform executing a virtual resource management, the physical device platform comprises at least one physical machine, the virtual resource management platform creates a virtual machine cluster; and the method comprises:
   obtaining, by the computer system, a resource average utilization rate constraint parameter of the virtual machine cluster;
   obtaining, by the computer system, a statistical value of a current resource average utilization rate of the virtual machine cluster; and
   comparing, by the computer system, the statistical value of the current resource average utilization rate of the virtual machine cluster with the resource average utilization rate constraint parameter of the virtual machine cluster;
   when the statistical value of the current resource average utilization rate of the virtual machine cluster is smaller than the resource average utilization rate constraint parameter of the virtual machine cluster by a difference less than a set tolerance threshold, suppressing, by the computer system, a physical machine capacity deduction operation on the physical device platform.

2. The method according to claim 1, wherein before obtaining a resource average utilization rate constraint parameter of the virtual machine cluster, the method further comprises:
   receiving a creation request for creating the virtual machine cluster, or a resource update request of the virtual machine cluster, wherein the creation request or the update request carries the resource average utilization rate constraint parameter of the virtual machine cluster; and recording the resource average utilization rate constraint parameter of the virtual machine cluster.

3. The method according to claim 1, wherein the suppressing physical machine capacity deduction operation on the physical device platform comprises:
   increasing a physical machine capacity deduction threshold on the physical device platform.

4. The method according to claim 1, wherein the suppressing physical machine capacity deduction operation on the physical device platform comprises:
   preventing a physical machine full migration and power-down operation on the physical device platform within a predetermined duration.

5. A resource management method in a computer system, wherein the computer system comprises a physical device platform executing a virtual resource management, the physical device platform comprises at least one physical machine, the virtual resource management platform creates a virtual machine cluster; and the method comprises:
   obtaining, by the computer system, a resource average utilization rate constraint parameter of the virtual machine cluster;
   obtaining, by the computer system, a statistical value of a current resource average utilization rate of the virtual machine cluster; and
   comparing, by the computer system, the statistical value of the current resource average utilization rate of the virtual machine cluster with the resource average utilization rate constraint parameter of the virtual machine cluster;
   when the statistical value of the current resource average utilization rate of the virtual machine cluster is smaller than the resource average utilization rate constraint parameter of the virtual machine cluster by a difference less than a set tolerance threshold, powering up, by the computer system, at least one physical machine on the physical device platform.

6. The method according to claim 5, wherein before the obtaining a resource average utilization rate constraint parameter of the virtual machine cluster, the method further comprises:
   receiving a creation request for creating the virtual machine cluster, or a resource update request of the virtual machine cluster, wherein the creation request or the update request carries the resource average utilization rate constraint parameter of the virtual machine cluster; and recording the resource average utilization rate constraint parameter of the virtual machine cluster.

7. The method according to claim 5, wherein the method comprising:
   obtaining an upper limit or the lower limit of total occupied resources of the virtual machine cluster;
   obtaining a statistical value of currently total occupied resources of the virtual machine cluster; and
   computing a difference between the statistical value of the currently total occupied resources of the virtual machine cluster and the upper limit of the total occupied resources of the virtual machine cluster, and according to the difference, selecting the at least one physical machine of a corresponding specification to perform a power-up operation.

8. The method according to claim 5, wherein before the powering up at least one physical machine on the physical device platform, the method further comprises:
   obtaining current use state information of the physical resource on the physical device platform, and if a remaining physical resource of a currently used physical machine is not sufficient, executing the step of powering up at least one physical machine on the physical device platform.

9. An apparatus for managing resource in a computer system, wherein the apparatus comprises a processor and a memory, the memory having a plurality of instructions stored thereon, that when executed by the processor, cause the processor to:
   obtain a resource average utilization rate constraint parameter of the virtual machine cluster;
   obtain a statistical value of a current resource average utilization rate of the virtual machine cluster; and
   compare the statistical value of the current resource average utilization rate of the virtual machine cluster with the resource average utilization rate constraint parameter of the virtual machine cluster;
   when the statistical value of the current resource average utilization rate of the virtual machine cluster is smaller than the resource average utilization rate constraint parameter of the virtual machine cluster by a difference less than a set tolerance threshold, suppress a physical machine capacity deduction operation on the physical device platform.

10. The apparatus according to the claim 9, the instructions further cause the processor to:
  receive a creation request for creating the virtual machine cluster, or a resource update request of the virtual machine cluster, wherein the creation request or the update request carries the resource average utilization rate constraint parameter of the virtual machine cluster; and recording the resource average utilization rate constraint parameter of the virtual machine cluster.

11. The apparatus according to the claim 9, the instructions further cause the processor to:
  increase a physical machine capacity deduction threshold on the physical device platform.

12. The apparatus according to the claim 9, the instructions further cause the processor to:
  prevent a physical machine full migration and power-down operation on the physical device platform within a predetermined duration.

13. An apparatus for managing resource in a computer system, wherein the apparatus comprises a processor and a memory, the memory having a plurality of instructions stored thereon, that when executed by the processor, cause the processor to:
  obtain a resource average utilization rate constraint parameter of the virtual machine cluster;
  obtain a statistical value of a current resource average utilization rate of the virtual machine cluster; and
  compare the statistical value of the current resource average utilization rate of the virtual machine cluster with the resource average utilization rate constraint parameter of the virtual machine cluster;
  when the statistical value of the current resource average utilization rate of the virtual machine cluster is smaller than the resource average utilization rate constraint parameter of the virtual machine cluster by a difference less than a set tolerance threshold, power up at least one physical machine on the physical device platform.

14. The apparatus according to the claim 13, the instructions further cause the processor to:
  receive a creation request for creating the virtual machine cluster, or a resource update request of the virtual machine cluster, wherein the creation request or the update request carries the resource average utilization rate constraint parameter of the virtual machine cluster; and recording the resource average utilization rate constraint parameter of the virtual machine cluster.

15. The apparatus according to the claim 13, the instructions further cause the processor to:
  obtain an upper limit or the lower limit of total occupied resources of the virtual machine cluster;
  obtain a statistical value of currently total occupied resources of the virtual machine cluster; and
  compute a difference between the statistical value of the currently total occupied resources of the virtual machine cluster and the upper limit of the total occupied resources of the virtual machine cluster, and according to the difference, select the at least one physical machine of a corresponding specification to perform a power-up operation.

16. The apparatus according to the claim 13, the instructions further cause the processor to:
  obtain current use state information of the physical resource on the physical device platform, and if a remaining physical resource of a currently used physical machine is not sufficient, execute the step of powering up at least one physical machine on the physical device platform.

* * * * *